US009749840B1

(12) United States Patent
Damle et al.

(10) Patent No.: US 9,749,840 B1
(45) Date of Patent: Aug. 29, 2017

(54) GENERATING AND ANALYZING CALL DETAIL RECORDS FOR VARIOUS USES OF MOBILE NETWORK RESOURCES

(71) Applicant: Cisco Technology, Inc., San Jose, CA (US)

(72) Inventors: Vinod Jagannath Damle, Cary, NC (US); Showen Yeh, Cary, NC (US); Imnaz Meher Jilani, Morrisville, NC (US); Raymond G. Prill, Raleigh, NC (US); Soon Teck Gibson Ang, Westford, MA (US); Walter Glenn Dixon, Fuquay Varina, NC (US); Kevin Franklin Clayton, Cary, NC (US); Michael J. Lemen, Durham, NC (US)

(73) Assignee: Cisco Technology, Inc., San Jose, CA (US)

( * ) Notice: Subject to any disclaimer, the term of this patent is extended or adjusted under 35 U.S.C. 154(b) by 4 days.

(21) Appl. No.: 14/945,867

(22) Filed: Nov. 19, 2015

(51) Int. Cl.
*H04M 11/00* (2006.01)
*H04W 8/18* (2009.01)
*H04M 15/00* (2006.01)

(52) U.S. Cl.
CPC ............. *H04W 8/18* (2013.01); *H04M 15/58* (2013.01)

(58) Field of Classification Search
CPC ... H04W 4/24; H04M 2215/32; H04M 15/00; H04L 2012/5607

USPC ....... 455/406, 407, 408; 379/114.03, 114.28, 379/115.01, 126–127.05; 370/310.2
See application file for complete search history.

(56) References Cited

U.S. PATENT DOCUMENTS

| 7,940,904 | B2 | 5/2011 | Cai et al. |
| 8,023,926 | B2 | 9/2011 | Cai et al. |
| 2015/0195771 | A1 | 7/2015 | Hurtta |

FOREIGN PATENT DOCUMENTS

WO 2013/059661 A1 4/2013

*Primary Examiner* — Steve D Agosta
(74) *Attorney, Agent, or Firm* — Edell, Shapiro & Finnan, LLC (57) ABSTRACT

Generating and analyzing call detail records for various uses of mobile network resources includes, at a mobile network service bus configured to communicate with one or more service entities in a mobile core network, generating a first set of call detail records (CDRs) for messages received from the service entities in the mobile core network and a second set of CDRs for messages received from a tenant server that is providing an applications or a service on the mobile core network. Each of the CDRs included in the first set of CDRs and the second set of CDRs is tagged based on the processes involved in generating the particular CDR. Relationships are determined between the CDRs included in the first set of CDRs and the second set of CDRs based on the tagging and one or more of usage operations and network diagnostic operations are performed based on the relationships.

18 Claims, 6 Drawing Sheets

GENERATING AND ANALYZING CALL DETAIL RECORDS FOR VARIOUS USES OF MOBILE NETWORK RESOURCES

TECHNICAL FIELD

The present disclosure relates to tracking mobile network usage.

BACKGROUND

In view of the tremendous growth in mobile data and bandwidth usage, service providers (i.e., mobile network operators) are spending significant resources to provide fast, reliable mobile core networks. In order to generate revenue with the mobile core network, service providers typically charge subscribers (i.e., mobile device users) for monthly access based on the amount of mobile core network resources used by the subscribers. More specifically, in some instances, service providers use call detail records (CDRs) that are generated by service entities in the mobile core network, such as a Policy and Charging Enforcement Function (PCEF), to implement charging. These CDRs can also be used for network capacity planning.

Additionally, as mobile networks have grown, there has also been tremendous growth in the development and dissemination of "over-the-top" applications and services. Over-the-top applications and services are offered by non-service provider tenants on the mobile core network, including non-third generation partnership project (non-3GPP) entities, such as content providers, content distribution network providers, and mobile applications providers. Although over-the-top applications and services are made available over mobile core networks, the usage of these applications is typically only tracked via end user network usage.

DESCRIPTION OF EXAMPLE EMBODIMENTS

Overview

Techniques are provided herein for generating and analyzing call detail records for various uses of mobile network resources. These techniques may be embodied as a method, an apparatus, and instructions in a computer-readable storage media to perform the method. According to at least one example embodiment, generating and analyzing call detail records for various uses of mobile network resources includes, at a mobile network service bus configured to communicate with one or more service entities in a mobile core network, generating a first set of call detail records (CDRs) for messages received from the service entities in the mobile core network and a second set of CDRs for messages received from a tenant server that is providing an applications or a service on the mobile core network. Each of the CDRs included in the first set of CDRs and the second set of CDRs is tagged, wherein a particular CDR is tagged based on the processes involved in generating the particular CDR. Relationships are determined between the CDRs included in the first set of CDRs and the second set of CDRs based on the tagging and one or more of usage operations and network diagnostic operations are performed based on the relationships.

Example Embodiments

Presented herein are techniques for generating and analyzing CDRs for various uses of mobile network resources. The generating and analyzing operations are performed by or at a Mobile Network Service Bus (MNSB) that serves as an orchestrator between a mobile core network and over-the-top applications and services that are being provided by tenants over the mobile core network. The techniques provided herein allow the MNSB to interact with various service entities, both within the mobile core network and externally of the mobile core network, that communicate using different protocols. Different mediators (i.e., physical devices, virtual devices, and/or processes) in the MNSB are used to interact with these service entities, and each mediator generates its own set of CDRs based on the different protocols used in its interactions.

Moreover, since correlating CDRs generated by multiple different devices together is typically difficult, the techniques provided herein provide the entire set of CDRs (the CDRs that are generated by any of the mediators) in a single location and sort, filter, and extract the CDRs based on at least mediator-specific tagging for each CDR. The sorted and filtered CDRs may provide a tool to easily analyze a complete end-to-end view of network usage, including usage attributable to or initiated on behalf of tenants (i.e., non-service providers, such as over-the-top application providers, including non-3GPP entities). The generated and sorted CDRs can also be used to analyze network usage for analytics, billing, auditing, triaging network failures, and capacity planning Consequently, service providers can effectively monetize and optimize their mobile networks, services, and subscriber information, perhaps via additional services offered through partnerships with tenants (i.e., non-3GPP partners). These partnerships may enable the service provider and partners to leverage the mobile core network and subscriber information to offer and/or provide services in an enriched manner.

Figure 1:
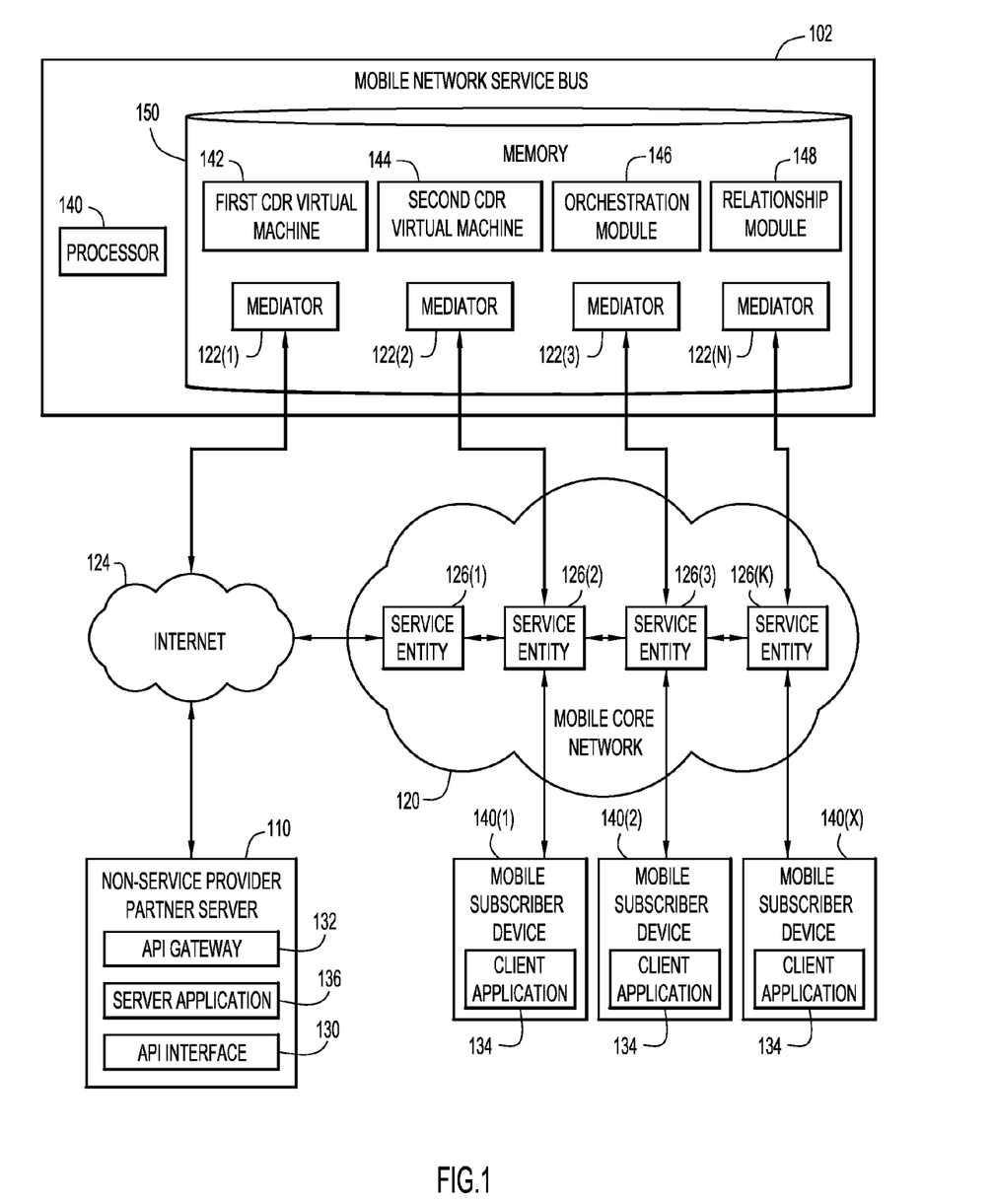
FIG. 1 is a block diagram of an environment in which CDRs are generated and analyzed for various uses of mobile network resources, according to an example embodiment.

Reference is first made to FIG. 1, which illustrates a network environment 100 for generating and analyzing CDRs for various uses of mobile network resources. In the network environment 100, the MNSB 102 sits between at least one non-service provider (tenant) server 110 (e.g., a content provider server or mobile application server) and a mobile core network 120 that is provided and maintained by a service provider. The mobile core network 120 provides connectivity for mobile subscriber devices 140(1)-(X) associated with the service provider. Meanwhile, the tenant server 110 may include a server application 136 that may provide support for a client application 134 that may be installed on the mobile subscriber devices 140(1)-(X) (i.e., downloaded via the mobile core network 120). The MNSB 102 includes mediators 122(1)-(n), such as devices, processes, protocols, functions, etc., configured to communicate with both the at least one tenant server 110, perhaps via the Internet 124, and service entities 126(1)-(*k*) included in the mobile core network 120. The mediators 122(1)-(*n*) may reside in memory 150 included on the MNSB 102. The service entities 126(1)-(*k*) may include aggregation functions, charging functions, control functions, switching functions, execution functions, gateway functions, etc. Moreover, in some embodiments, the service embodiments may be included in or embodied by network devices (i.e., network elements) such as switches, routers, and other such devices.

Since the tenant server 110 and the mobile core network 120 use different protocols to interact with the MNSB 102, the mediators 122(1)-(*n*) may include a number of different devices and/or processes. For example, the tenant server 110 may include an application programming interface (API) interface 132, such as a Hypertext Transfer Protocol (HTTP) API interface, that is configured to communicate with the MNSB 102 through an API gateway 132 and mediator 122(1) may be configured accordingly. An HTTP API interface may enable service providers to securely expose network, service, and subscriber information to tenants so that tenants have the ability to program such elements in the service provider network. By comparison, the MNSB 102 may interact with the service entities 126(1)-(*k*) of the mobile core network 120, in connection with functions such as a Policy and Charging Rules Function (PCRF), via interfaces such as a receiving interface with Diameter protocol (Diameter Rx).

Still referring to FIG. 1, the MNSB 102 performs translation and mapping between the various protocols used by the mediators in interactions. More specifically, the MNSB 102 includes a processor 140 and a memory 150 with an orchestration module 146 configured to translate and map between various protocols. In other words, the orchestrations module 146 allows the MNSB 102 to server as an orchestration function. Moreover, since the MNSB 102 performs translation and mapping between the different protocols, it is in a unique position to be able to generate CDRs for messages originating from the various interfaces that interact with the MNSB 102. Consequently, the memory 150 also includes a first CDR virtual machine 142 and a second CDR virtual machine 144 that are each configured to generate CDRs for any interactions with the tenant server 110 and/or the service entities 126(1)-126(*k*) in the mobile core network 120. The first CDR virtual machine 142 and the second CDR virtual machine 144 are also each configured to tag the generated CDRs with at least mediator-specific tags, as is discussed below in further detail. Still further, the memory 150 includes a relationship module 148 which may analyze the generated and tagged CDRs to find relationships therebetween and facilitate various operations based on the relationships.

Although each module described herein, such as the orchestration module 146 and the relationship module 148, is shown stored in memory 150, each module described herein, may be hardware, or a combination of hardware and software. For example, each module may include and/or initiate execution of an application specific integrated circuit (ASIC), a Field Programmable Gate Array (FPGA), a circuit, a digital logic circuit, an analog circuit, a combination of discrete circuits, gates, or any other type of hardware, or combination thereof. Accordingly, as used herein, execution of a module by processor 140 can also refer to logic based processing by the module that is initiated directly or indirectly by the processor 140 to complete a process or obtain a result. Alternatively or additionally, each module can include memory hardware, such as at least a portion of a memory, for example, that includes instructions executable with a processor to implement one or more of the features of the module. When any one of the modules includes instructions stored in memory and executable with the processor, the module may or may not include a processor. In some examples, each unit may include only memory storing instructions executable with the processor 140 to implement the features of the corresponding module without the module including any other hardware.

The memory 150 may also be configured to store any CDRs generated by the MNSB 102, tags used by the MNSB, instructions related to generating and tagging CDRs, or any other data. Generally, memory 150 may include read only memory (ROM), random access memory (RAM), magnetic disk storage media devices, optical storage media devices, flash memory devices, electrical, optical or other physical/tangible (e.g., non-transitory) memory storage devices. Thus, in general, the memory 150 may be or include one or more tangible (non-transitory) computer readable storage media (e.g., a memory device) encoded with software comprising computer executable instructions. For example, memory 150 may store instructions that may be executed by processor 140 for performing the CDR generation, tagging, and analysis via the respective virtual machines and modules and as described below with reference to FIGS. 2-6. In other words, memory 150 may include instructions, that when executed by one or more processors, cause the one or more processors to carry out the operations described below in connection with FIGS. 2-6.

Figure 2:
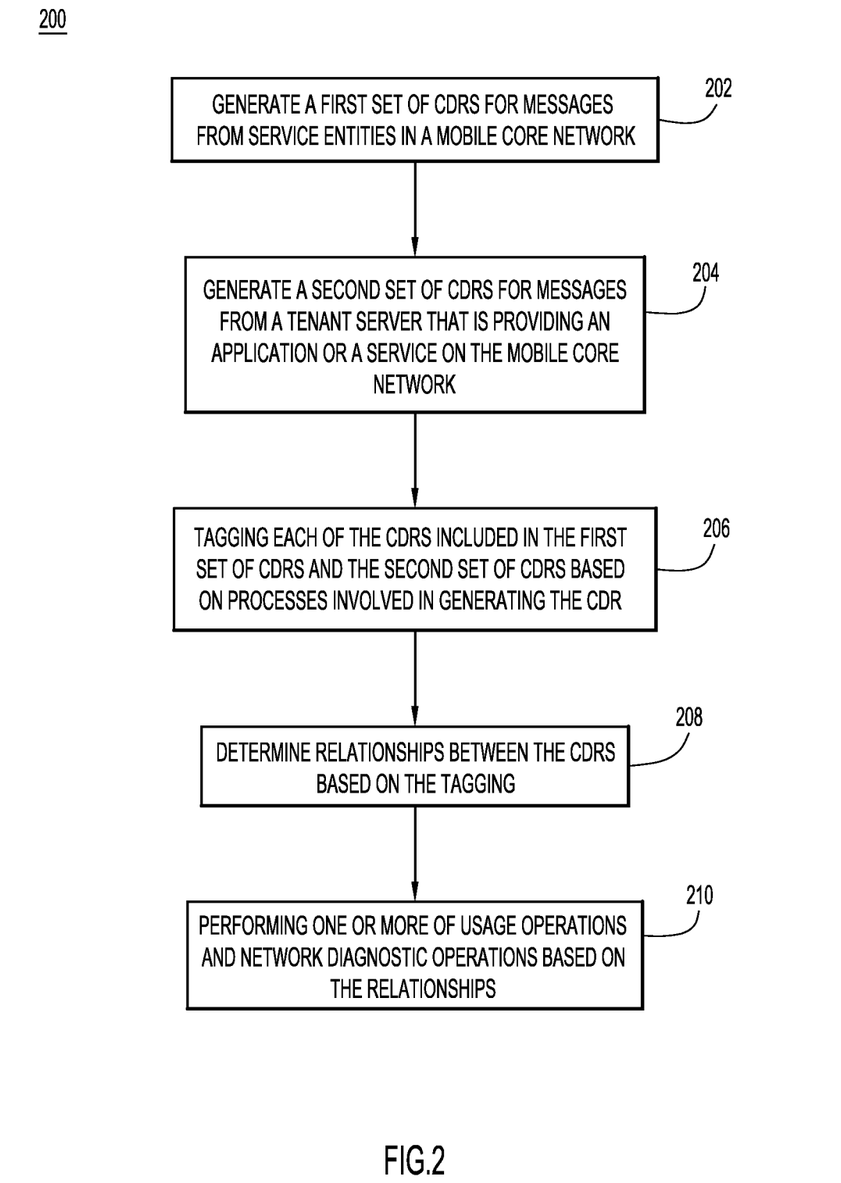
FIG. 2 is a high-level flowchart illustrating a process for generating and analyzing CDRs for various uses of mobile network resources, according to an example embodiment.

Reference is now made to FIG. 2 (with continued reference to FIG. 1) for a high-level description of a method 200 for generating and analyzing CDRs, such as performed by execution of the software instructions included in the memory 150 of the MNSB 102. Initially, at step 202, a first set of CDRs are generated by the MNSB 102, for any messages (i.e., requests, responses, callbacks, etc.) exchanged between the MNSB 102 and the mobile core network 120. These messages, which may be referred to herein as mobile core network messages and/or southbound messages, may represent any data packets generated in response to a user's interaction with standard mobile phone functions, such as calls and texts. At step 204, a second set of CDRs are generated by the MNSB 102, for any interactions (i.e., requests, responses, callbacks, advanced architecture request (AAR), advanced architecture answer (AAA), etc.) from or related to applications provided by the service provider's tenants. For example, CDRs may be generated for any messages that are exchanged between the MNSB 102 and the tenant server 110 of a non-service provider that is partnered with the service provider that operates the mobile core network 120. Messages from or related to applications provided or serviced by the tenant server may be referred to herein as northbound messages.

However, since the first set of CDRs and the second set of CDRs may be generated on different devices on the MNSB 102, the CDRs may not provide a complete view of a tenant or mobile subscriber's network usage. For example, if a tenant was simply given access to all of the CDRs generated at steps 202 and 204, the tenant would be required to sort through large volumes of CDRs from many different devices. Consequently, steps 206, 208, and 210 analyze the CDRs and perform usage and diagnostic operations on the CDRs. Initially, at step 206, each of the CDRs included in the first set of records and the second set of records is tagged based on the mediators (i.e., processes, functions, protocols, virtual devices, and/or physical devices) involved in generating the message. More specifically, every CDR that is generated on a mediator 122 of the MNSB 102 is tagged with at least unique tags/identifiers that are specific to the interface that the mediator 122 is using for interactions. In fact, when CDRs are generated on multiple mediators 122 on the MNSB 102, the unique identifiers get passed from one device to another and are included in the generated CDRs, as is explained in further detail below with respect to FIG. 4. In some embodiments, every CDR that is generated on a mediator 122 of the MNSB 102 may also be tagged with a tag/identifier that is unique for a particular session, transaction, or other such value. Additionally or alternatively, tags/identifiers can also be customized to provide specific data that is helpful for a specific analysis, customer, statistical measure, or any other reason.

Once the CDRs in the first set of CDRs and the second set of CDRs, or at least once a portion of the CDRs in the first set of CDRs and the second set of CDRs are tagged, the MNSB 102 can determine relationships between the CDRs based on the tags, perhaps via relationship module 148. For example, the relationship module 148 can locate any CDRs from the same session or same device. Then, at step 210, one or more of usage operations and network diagnostic operations can be performed based on the relationships.

In some embodiments, the usage operations may correlate the tagged CDRs into meaningful flows and events. For example, all CDRs that correspond to a specific sub-set of network traffic driven by mobile subscribers using a specific tenant application (i.e., a television streaming application) can be grouped together. Consequently, any network resources used in connection with the specific tenant application can be accounted for. Moreover, in some embodiments, the MNSB 102 can extract a group of CDRs, filter the CDRs based on criteria received from a customer, or otherwise manipulate and analyze the CDRs. Additionally or alternatively, the service provider could provide customers with access to the tagged CDRs so that customers could filter and group together CDRs based on specific criteria and utilize the CDRs in a way that is beneficial to the customer.

In some embodiments, the usage or network diagnostic operations may be performed as the relationships are identified or determined. For example, the CDRs could be sorted, filtered, or grouped in real-time, as interaction messages are received at the MNSB 102 and CDRs are generated. In these embodiments, the first set of CDRs and the second set of CDRs are not complete sets and simply represent an open-ended group of CDRs being generated on a specific mediator 122. However, in other embodiments, the CDRs from a specific period of time may be tagged and analyzed, (i.e., relationships determined and operations performed) subsequent to that period of time.

Figure 3:
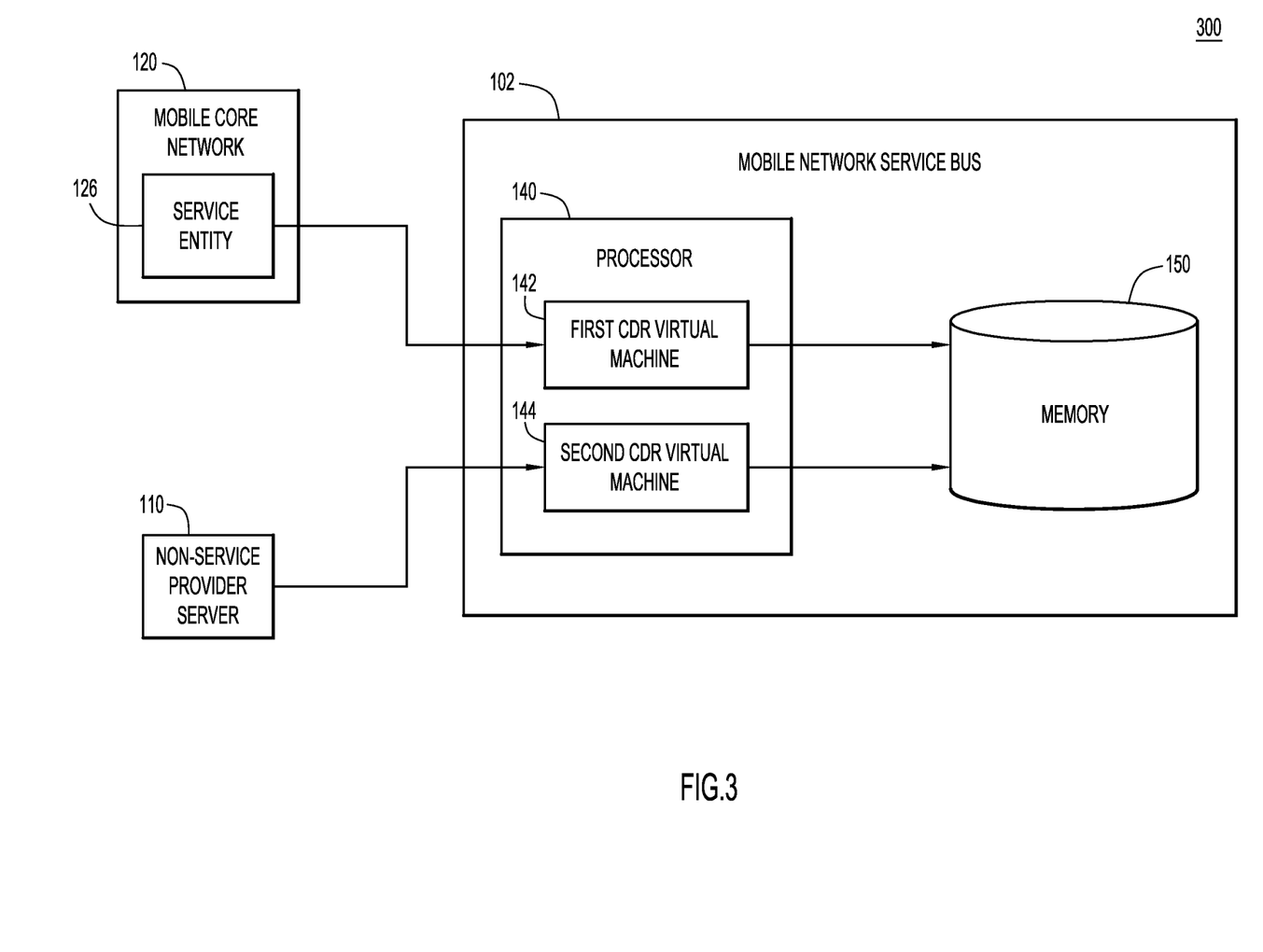
FIG. 3 is a diagram depicting an example process for generating CDRs, according to an example embodiment.

Reference is now made to FIG. 3, which illustrates a diagram depicting a method 300 for generating CDRs, according to an example embodiment. In method 300, the first CDR virtual machine 142 is generating a first set of CDRs for "southbound" messages received from a service entity 126(1)-(k) in the mobile core network 120 and the second CDR virtual machine 144 is generating a second set of CDRs for "northbound" messages received from a tenant server 110. In the depicted embodiment, two distinct virtual machines are utilized in order to generate the CDRs for the northbound and southbound messages (i.e., messages received via two distinct interactions); however, in other embodiments, any number of virtual machines may generate CDRs for the northbound and southbound messages. In the depicted embodiment, CDRs generated by the first virtual machine 142 for southbound messages in MNSB 102 capture details of the interactions with a service entity 126(1)-(k) in the mobile core network 120, such as diameter protocol message interactions with a PCRF service entity in the MPC. Meanwhile, CDRs generated by the second virtual machine 144 for northbound messages in the MNSB 102 capture details of the API request/response/callback such as timestamps, session/transaction identifiers, source endpoint details, partner details, and parameters that need to be provisioned in the mobile core network.

According to at least one embodiment, northbound CDRs may have at least one of the following formats:

(1) Request, Time_Of_Day, Session_ID, Transaction_ID, Source_IP_address, Source_Application, Tenant, Callback_Uniform Resource Identifier (URI), Callback_Token, Subscriber_Mobile Station International Subscriber Directory Number (MSISDN), Quality of Service (QoS) Class Identifier (QCI);

(2) Response, Time_Of_Day, Session_ID, Transaction_ID, Status; and (3) Callback, Time_Of_Day, Session_ID, Transaction_ID, Callback_URI, Callback_Token, QoS_Status, Subscriber_MSISDN, Max_BitRate_Upload (UL), Max_BitRate_Download (DL), Used_Volume, Used_Duration, Status.

Meanwhile, southbound CDRs may have a format specified for the specific interface exchange, such as a Diameter Rx AAR/AAA exchange. As examples, the southbound CDR may have at least one of the following formats:

(1) AAR, Time_Of_Day, Session_ID, Transaction_ID, Diameter_Session_ID, Advanced Format (AF)-Application-Identifier, MSISDN, International Mobile Subscriber Identity (IMSI), Called-Station-ID, Access Point Name (APN)-AggregateMaxBitRate-UL, APN-Aggregate-MaxBitRate-DL, Sponsor_ID, Credit Control (CC)-Total-Octets, CC-Time, Max-Requested-Bandwidth-UL, Max-Requested-BandwidthDL, Flow_Descriptions, Media_Type; and (2) AAA, Time_Of_Day, Session_ID, Transaction_ID, Diameter_Session_ID, Result_Code.

In these CDR format examples, the Session ID and the Transaction ID may be tags which include information relating to the interaction that may allow the CDR to be sorted or filtered. These tags are described in more detail with respect to FIGS. 4 and 5.

Based on the above CDR formats, the MNSB 102 can account for requests sent by a tenant (e.g., a non-3GPP partner) and/or by a mobile subscriber (i.e., based on the Mobile Station International Subscriber Directory Number (MSISDN)) and the associated resource usage in the network ('used-volume', 'used-duration,' etc.). Furthermore, data from the above CDRs can be used for billing and network capacity planning. In other solutions, CDRs are only generated by service entities in a service provider's mobile core network and, thus, only provide information related to messages that traverse the mobile core network. However, that information is not sufficient for service providers to account for usage of resources by both tenants (i.e., non-3GPP partners) and mobile subscribers in the MNSB's 102 environment. By generating CDRs for interactions with tenants and customers, the MNSB 102 has access to the entire set of information related to both API transactions and the message exchanges on the mobile core network 120.

Figure 4:
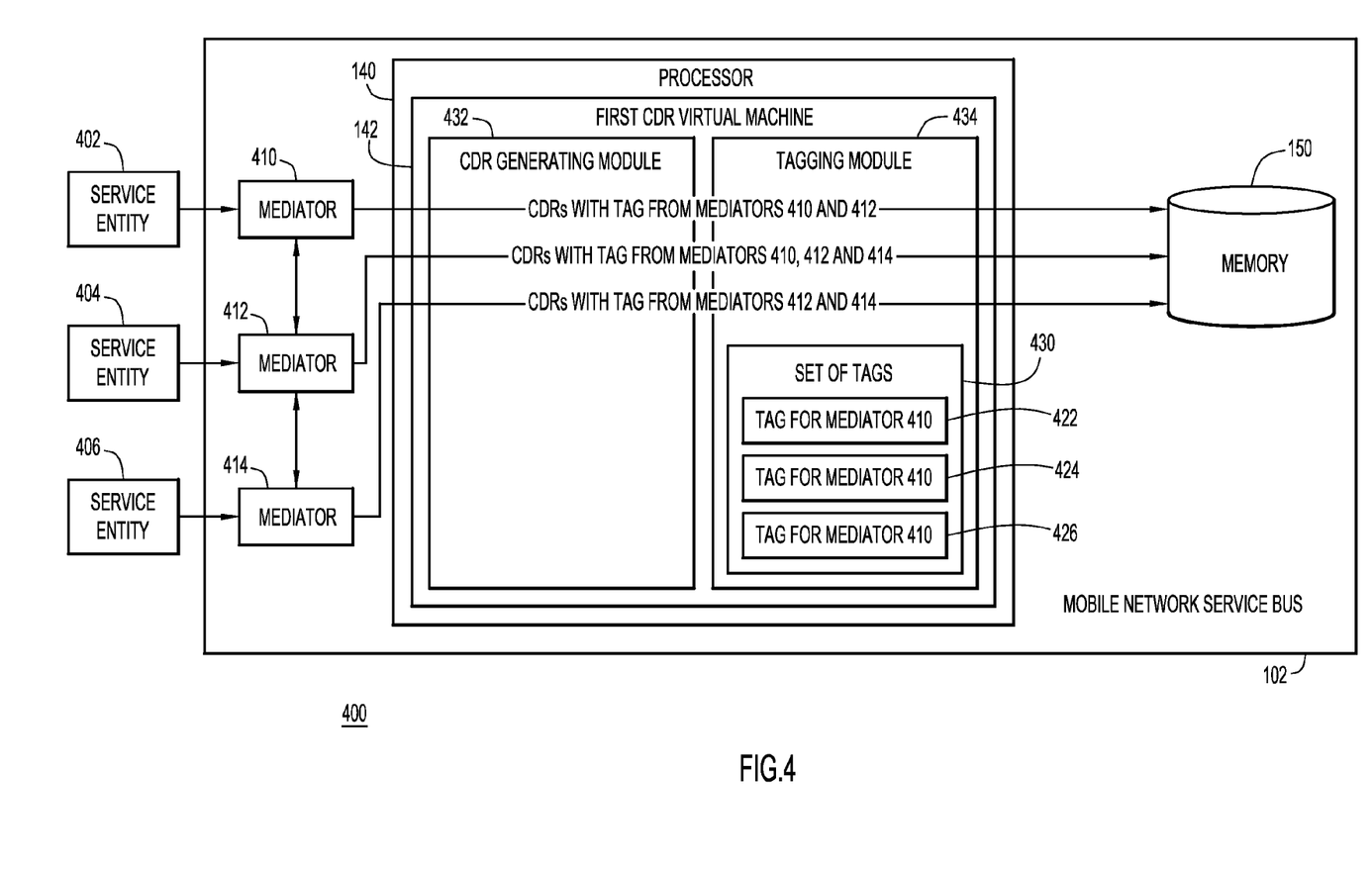
FIG. 4 is a diagram depicting an example process for tagging CDRs, according to an example embodiment.
Figure 5A:
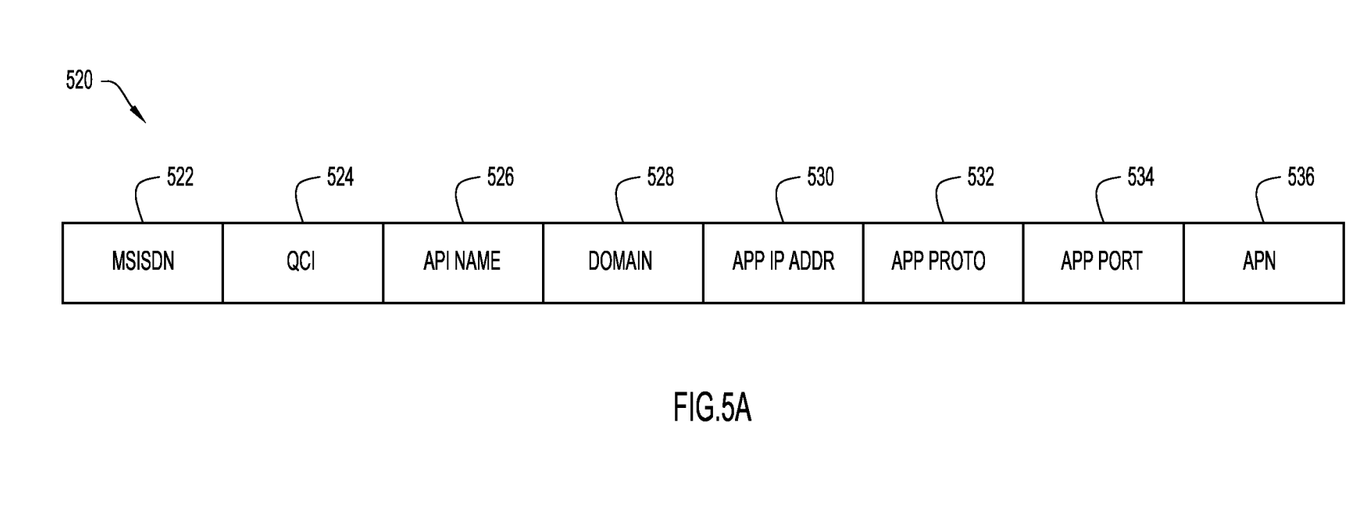
FIGS. 5A and 5B are diagrams depicting example CDRs tags, according to an example embodiment.
Figure 5B:
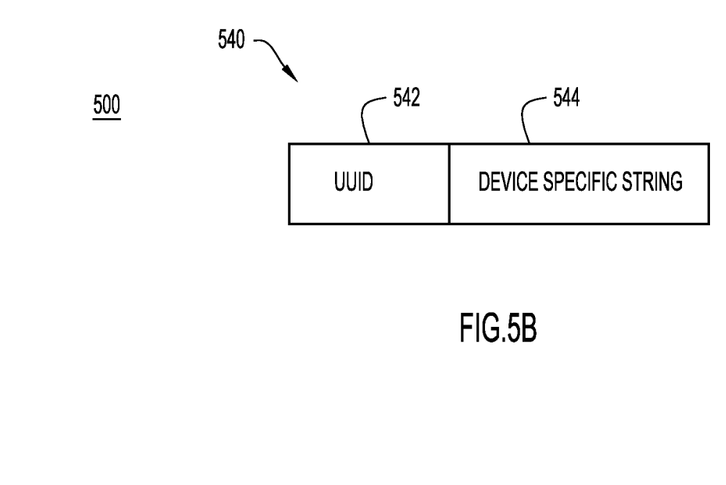

Referring now to FIG. 4, in some embodiments the first virtual machine 142 and the second virtual machine 144 may each include a CDR generating module 432 and a tagging module 434. Although FIG. 4 only shows the first CDR virtual machine 142 including a CDR generating module 432 and a tagging module 434, it is to be understood that the second CDR virtual machine 144 may also include the same modules. Moreover, the concepts shown in FIG. 4 and described herein may also apply to the second CDR virtual machine 144 or any other CDR virtual machines included on the MNSB 102.

As shown in FIG. 4, as or after the first and second sets of CDRs are generated by the CDR generating module 432 based on messages received at mediators 122, the CDRs are tagged by the tagging module 434 with unique identifiers/tags that are specific to the interface of the respective mediator 122 which received the message. In order to tag the various CDRs, the tagging module 434 includes a set of tags 430 that includes a tag for mediator 422, a tag for mediator 424, and a tag for mediator 426. However, as mentioned, in some embodiments, CDRs are generated on multiple mediators 122 on the MNSB 102. In these embodiments, the unique tags/identifiers get passed from one mediator 122 to another and the tagging module 434 may include the mediator-specific tags of each mediator 122 that was involved in the CDR.

For example, in the embodiment illustrated in FIG. 4, the MNSB 102 includes three mediators: mediator 410; mediator 412; and mediator 414. Each of mediator 410, mediator 412, and mediator 414 is configured to receive messages from service entity 402, service entity 404, and service entity 406, respectively. However, mediator 410 and mediator 414 are also configured to communicate with mediator 412. Thus, as messages are received at mediator 410, mediator 412, and mediator 414 from their respective service entities, mediator 410 and mediator 414 can also send the messages to mediator 412. In other words, a CDR can be generated on multiple mediators of the MNSB. Consequently, when CDRs are created, the CDRs generated based on messages initially received at mediator 410 will have tags from mediator 410 and mediator 412, and CDRs generated based on messages initially received at mediator 414 will have tags from mediator 414 and mediator 412. Similarly, CDRs generated based on messages initially received at mediator 412 will have tags from all three of mediator 410, mediator 412, and mediator 414.

Moreover, in some embodiments, any virtual machines included on the MNSB may interact in order to share tags/identifiers. For example, in some embodiments, the first virtual machine 142 may pass the first set of tags 430 to the second virtual machine 144. Similarly, the second virtual machine 144 may share tags used by the first virtual machine 142, such that a universal set of tags is created. As is described in more detail with respect to FIG. 6, the tags may facilitate various analysis operations performed on the generated and tagged CDRs.

Still referring to FIG. 4, once the generating module 432 and a tagging module 434 of a virtual machine 142, 144 generate and tag CDRs, the CDRs may be aggregated and stored in memory 150. Storing all of the CDRs in a single location may enhance the ability to perform operations on the tagged CDRs. Most notably, instead of having to search through multiple locations of CDRs, any analysis tool can simply review the CDRs stored in memory 150.

Now referring to FIGS. 5A and 5B, example tags generated by the first virtual machine 142 and the second virtual machine 144 according to an example embodiment are illustrated. In FIG. 5A, tag 520 represents a tag that is applied to a CDR generated by the second virtual machine 144 for a northbound message (i.e., requests, responses, or callbacks exchanged between the MNSB and the tenant ecosystem) and, in FIG. 5B, tag 540 represents a tag applied to a CDR generated by the first virtual machine 142 for a southbound message (i.e., messages exchanges on the mobile core network 120). More specifically, tag 520 is a "Session ID" that tags each CDR with information about the particular session the CDR belongs to. Similarly, tag 540 is a "transaction ID" tag that provides other identifying information. Tags 520 and 540 are merely examples of one embodiment but, in other embodiments, any tags/identifiers may be applied to any CDRs generated by any virtual machines.

According to at least one embodiment, the session ID tag 520 includes the mobile subscriber's MSISDN in field 522, QoS Class Identifier (QCI) in field 524, the name of the API being invoked by the tenant in field 526, the tenant domain name in field 528, the Internet Protocol (IP) address of the tenant's application server in field 530, the protocol of the application server for which the targeted QoS is being requested in field 532, the port of the application server for which the targeted QoS is being requested in field 534, and the Access Point Name (APN) in field 536. By comparison, the Transaction ID tag 540 includes a Universally Unique Identifier (UUID) in field 542 and a device-specific string that is unique for each transaction initiated by the mobile subscriber in field 544.

Figure 6:
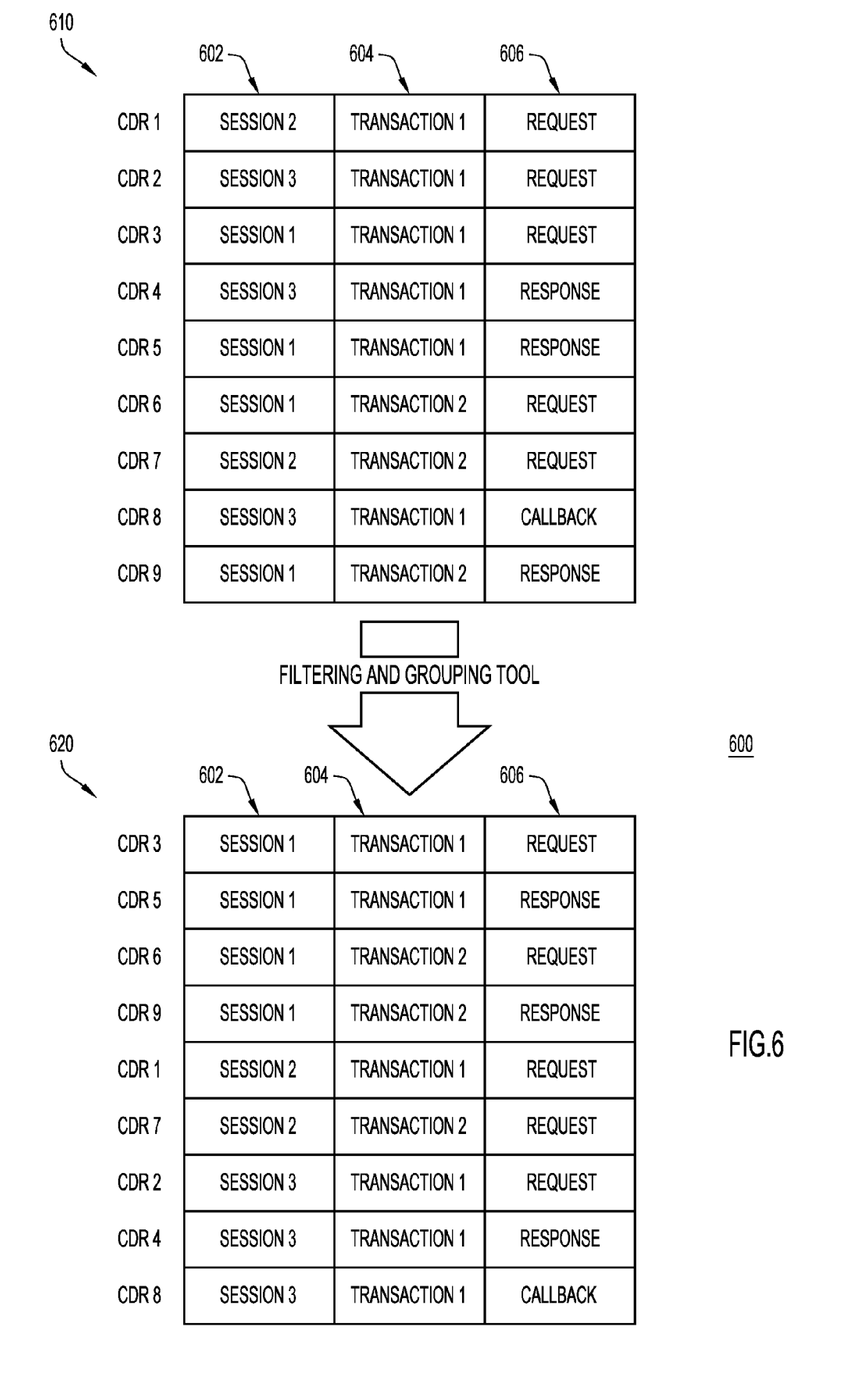
FIG. 6 is a diagram depicting an example process for analyzing CDRs, according to an example embodiment.

Now referring to FIG. 6, by tagging CDRs in the manner described herein, the MNSB 102 enables various operations to be performed on the CDRs, such as to allow usage of network resources to be tracked at both the level of a tenant accessing the mobile core network and the level of a mobile subscriber accessing the mobile core network. In the embodiment depicted in diagram 600, each of the generated CDRs has been tagged with a session number 602, a transaction number 604, and a message classification 606. The MSNB 102 can then determine relationships between the CDRs based on these tags and perform usage operations and diagnostic operations based on the relationships. For example, the CDRs can be filtered based on the relationships between the CDRs so that a service provider can account for the requests sent by a tenant (e.g., non-3GPP partner) and/or by a mobile subscriber (i.e., based on MSISDN) and the associated resource usage in the network. For example, initially, the CDRs may be ordered chronologically at 610. However, after filtering the CDRs by any related information included in the session tag 602, usage operations can be performed on related CDRs to show an entire message sequence that is associated with an initial request.

In some embodiments, once the CDRs are aggregated in one location (i.e. memory 150), the MNSB 102 can either perform usage and diagnostic operations with the CDRs or provide the customer with a tool to perform the same operations. The operations may filter out all messages for a mobile subscriber session, and then further filter out the specific transactions for that particular session. For instance, the operations can use an R script to group together CDRs by a mobile subscriber's MSISDN and then filter records for a particular subscriber session based on transaction ID or timestamp. In another example, operations could filter API requests that are for a particular sponsor based on Sponsor ID. The usage operations may also collect statistics about mobile subscribers who use the API most frequently and for which application servers they requested the updated QoS.

In some embodiments, the MNSB may perform usage operations to determine network resource and service usage by a tenant by filtering based on the 'domain' field 528 in the Session ID 520. Alternatively, the MNSB 102 may perform usage operations to determine network resource and service usage by a mobile subscriber due to access triggered from a tenant's ecosystem by filtering based on the 'domain' field 528 and the MSISDN field 522 in Session ID 520. Still further, the MNSB may perform usage operations to determine additional usage of network resources due to traffic generated by interaction of mobile subscribers with tenant ecosystems by aggregating CDR data based on the 'domain' field 528 in Session ID 520 to aid network capacity planning. The MNSB 102 may also perform usage operations to audit the usage of network resources by a tenant by aggregating CDR data based on 'domain' field 528 and validating the same with partner agreements with the tenants. The MNSB 102 may also perform usage operations to determine the most popular and heavily referenced tenant servers among mobile subscribers/partners by aggregating CDR data based on 'App Server' field attributes of Session ID. The MNSB may also perform usage operations to generate billing records for a billing system by filtering CDRs by MSISDN field 522 or some other identifier. Moreover, the MNSB 102 can perform diagnostic operations, such as security related tasks and analysis based on malicious requests received by MNSB 102 and failure analysis and triage when end-to-end call flows do not work as expected. The MNSB 102 can also audit API requests received with the partner agreements for tenants.

There are several advantages to the techniques presented herein. As one example, by providing and correlating an entire set of CDRs for network traffic, the MNSB provides a complete end-to-end view of usage of a service provider's network, such that resource usage from traffic generated by multiple devices can be easily tracked and analyzed. Consequently, the service provider and/or the MNSB can efficiently and adequately perform usage and diagnostic operations. By comparison with previous solutions, the MNSB does not only track and identify subscriber sessions and the related resource usage, but also relates this usage with the API interactions in a tenant environment so that resource usage can be accounted for, both at the tenant level and the subscriber level. Moreover, the MNSB can support interactions with multiple networking elements that all communicate using different protocols and generate mediator specific CDRs, thereby reducing the need to sort through multiple volumes of CDRs for various analytical purposes, a task that would otherwise be cumbersome and difficult with CDRs that lack tagging and/or aggregation to a single storage location (i.e., memory 150). The MNSB can also be extended over time to support additional protocols and to support more customized device-specific tagging over time.

To summarize, in one form, a method is provided comprising: at a mobile network service bus configured to communicate with service entities in a mobile core network, generating a first set of call detail records (CDRs) for messages received from the service entities in the mobile core network; generating a second set of CDRs for messages received from a tenant server that is providing an application or a service on the mobile core network; tagging each of the CDRs included in the first set of CDRs and the second set of CDRs, wherein a particular CDR is tagged based on processes involved in generating the particular CDR; determining relationships between the CDRs included in the first set of CDRs and the second set of CDRs based on the tagging; and performing one or more of usage operations and network diagnostic operations based on the relationships.

In another form, an apparatus is provided comprising: one or more mediators configured to communicate with one or more service entities in a mobile core network; and a processor configured to: generate a first set of call detail records (CDRs) for messages received at the one or more mediators from the service entities in the mobile core network; generate a second set of CDRs for messages received at the one or more mediators from a tenant server that is providing an application or a service on the mobile core network; tag each of the CDRs included in the first set of CDRs and the second set of CDRs, wherein a particular CDR is tagged based on the processes involved in generating the particular CDR; determine relationships between the CDRs included in the first set of CDRs and the second set of CDRs based on the tagging; and perform one or more of usage operations and network diagnostic operations based on the relationships.

In yet another form, a non-transitory computer-readable storage media is provided encoded with software comprising computer executable instructions and when the software is executed operable to: generate a first set of call detail records (CDRs) for messages received from service entities in a mobile core network; generate a second set of CDRs for messages received from a tenant server that is providing an application or a service on the mobile core network; tag each of the CDRs included in the first set of CDRs and the second set of CDRs, wherein a particular CDR is tagged based on the processes involved in generating the particular CDR; determine relationships between the CDRs included in the first set of CDRs and the second set of CDRs based on the tagging; and perform one or more of usage operations and network diagnostic operations based on the relationships.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
   at a mobile network service bus configured to communicate with service entities in a mobile core network, generating a first set of call detail records (CDRs) for messages received from the service entities in the mobile core network;
   generating a second set of CDRs for messages received from a tenant server that is providing an application or a service on the mobile core network;
   tagging each of the CDRs included in the first set of CDRs and the second set of CDRs, wherein a particular CDR is tagged based on processes involved in generating the particular CDR; determining relationships between the CDRs included in the first set of CDRs and the second set of CDRs based on the tagging; and
   performing one or more of usage operations and network diagnostic operations including one or more of determining usage of the mobile core network attributable to a mobile device or the tenant server, determining usage of the mobile core network due to traffic generated by interaction of a mobile device with the tenant server, auditing usage of the mobile core network attributable to the tenant server, determining a most popular and heavily referenced tenant server, or generating billing records for a billing system, based on the relationships,
   wherein the mobile network service bus includes one or more mediators that communicate with the one or more service entities in the mobile core network, and the tagging further comprises:

determining at least one mediator of the mediators that was involved in generating the particular CDR; and tagging the particular CDR with a tag from the set of tags that is representative of each of the at least one mediator that was involved in the generating.

2. The method of claim 1, further comprising:
storing the first set of CDRs together with the second set of CDRs in a memory.

3. The method of claim 1, wherein tagging further comprises: associating at least one tag from a set of tags with the particular CDR.

4. The method of claim 1, wherein each CDR is associated with a session and performing further comprises:
grouping the particular CDR with other CDRs associated with the same session.

5. The method of claim 1, wherein the application or service is an over-the-top application or over-the-top service.

6. The method of claim 1, further comprising storing a different tag for each of the plurality of mediators.

7. The method of claim 6, wherein a first mediator was involved in generating the first set of CDRs, and the first set of CDRs is tagged with a first tag representative of the first mediator, the method further comprising:
forwarding the first set of CDRs with the first tag to a second mediator that was involved in generating the second set of CDRs; and
tagging the first set of CDRs with a second tag representative of the second mediator.

8. An apparatus comprising:
one or more mediators configured to communicate with one or more service entities in a mobile core network; and
a processor configured to:
generate a first set of call detail records (CDRs) for messages received at the one or more mediators from the service entities in the mobile core network;
generate a second set of CDRs for messages received at the one or more mediators from a tenant server that is providing an application or a service on the mobile core network;
tag each of the CDRs included in the first set of CDRs and the second set of CDRs, wherein a particular CDR is tagged based on the processes involved in generating the particular CDR, wherein in tagging each of the CDRs, the processor is further configured to determine at least one mediator of the one or more mediators that was involved in generating the particular CDR, and tag the particular CDR with a tag from a set of tags that is representative of each of the at least one mediator that was involved in generating the particular CDR;
determine relationships between the CDRs included in the first set of CDRs and the second set of CDRs based on the tagging; and
perform one or more of usage operations and network diagnostic operations including one or more of: determining usage of the mobile core network attributable to a mobile device or the tenant server, determining usage of the mobile core network due to traffic generated by interaction of a mobile device with the tenant server, auditing usage of the mobile core network attributable to the tenant server, determining a most popular and heavily referenced tenant server, or generating billing records for a billing system, based on the relationships.

9. The apparatus of claim 8, further comprising:
memory, wherein the processor is further configured to store the first set of CDRs together with the second set of CDRs in the memory.

10. The apparatus of claim 8, wherein the processor is further configured to:
associate at least one tag from a set of tags with the particular CDR.

11. The apparatus of claim 8, wherein each CDR is associated with a session and, in performing, the processor is further configured to:
group the particular CDR with other CDRs associated with the same session.

12. The apparatus of claim 8, the application or the service is an over-the-top application or an over-the-top service.

13. The apparatus of claim 8, wherein a first mediator was involved in generating the first set of CDRs, and the processor is further configured to:
tag the first set of CDRs with a first tag representative of the first mediator;
forward the first set of CDRs with the first tag to a second mediator that was involved in generating the second set of CDRs; and
tag the first set of CDRs with a second tag representative of the second mediator.

14. A non-transitory computer-readable storage media encoded with software comprising computer executable instructions which, when executed by a processor of an apparatus, cause the processor to:
generate a first set of call detail records (CDRs) for messages received from service entities in a mobile core network;
generate a second set of CDRs for messages received from a tenant server that is providing an application or a service on the mobile core network;
tag each of the CDRs included in the first set of CDRs and the second set of CDRs, wherein a particular CDR is tagged based on the processes involved in generating the particular CDR, wherein each of the messages received from the service entities and each of the messages received from the tenant servers are received at mediators, and the instructions that cause the processor to tag include instructions that cause the processor to determine at least one mediator of the mediators that was involved in generating the particular CDR, and tag the particular CDR with a tag from a set of tags that is representative of each of the at least one mediator that was involved in generating the particular CDR;
determine relationships between the CDRs included in the first set of CDRs and the second set of CDRs based on the tagging; and
perform one or more of usage operations and network diagnostic operations including one or more of: determining usage of the mobile core network attributable to a mobile device or the tenant server, determining usage of the mobile core network due to traffic generated by interaction of a mobile device with the tenant server, auditing usage of the mobile core network attributable to the tenant server, determining a most popular and heavily referenced tenant server, or generating billing records for a billing system, based on the relationships.

15. The non-transitory computer-readable storage media of claim 14, wherein the instructions cause the processor further to:
store the first set of CDRs together with the second set of CDRs in a memory.

16. The non-transitory computer-readable storage media of claim 14, wherein the instructions cause the processor further to:
   associate at least one tag from a set of tags with the particular CDR.

17. The non-transitory computer-readable storage media of claim 14, wherein the instructions cause the processor further to:
   group the particular CDR with other CDRs associated with the same session.

18. The non-transitory computer-readable storage media of claim 14, wherein a first mediator was involved in generating the first set of CDRs, and the instructions cause the processor further to:
   tag the first set of CDRs with a first tag representative of the first mediator;
   forward the first set of CDRs with the first tag to a second mediator that was involved in generating the second set of CDRs; and
   tag the first set of CDRs with a second tag representative of the second mediator.

\* \* \* \* \*